(12) United States Patent
Lee

(10) Patent No.: US 8,253,743 B2
(45) Date of Patent: Aug. 28, 2012

(54) METHOD AND SYSTEM FOR PROVIDING CHARACTER HAVING GAME ITEM FUNCTIONS

(75) Inventor: Joon-Mahn Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 701 days.

(21) Appl. No.: 11/573,200

(22) PCT Filed: Aug. 18, 2005

(86) PCT No.: PCT/KR2005/002716
§ 371 (c)(1),
(2), (4) Date: Feb. 27, 2007

(87) PCT Pub. No.: WO2006/022490
PCT Pub. Date: Mar. 2, 2006

(65) Prior Publication Data
US 2007/0197296 A1    Aug. 23, 2007

(30) Foreign Application Priority Data
Aug. 27, 2004   (KR) .................. 10-2004-0067871

(51) Int. Cl.
*G06T 13/00* (2011.01)
*A63F 9/24* (2006.01)

(52) U.S. Cl. ........................................ 345/473; 463/42

(58) Field of Classification Search .................. 463/42; 345/473
See application file for complete search history.

(56) References Cited

U.S. PATENT DOCUMENTS
2005/0137015 A1* 6/2005 Rogers et al. ................... 463/42

FOREIGN PATENT DOCUMENTS
| JP | 2004-004696 | * | 1/2004 |
| KR | 2002-0073313 | * | 9/2002 |
| KR | 2003-0026506 |   | 4/2003 |
| KR | 2003-0089023 |   | 11/2003 |
| KR | 2003-0094703 | * | 12/2003 |
| KR | 2004-0069303 |   | 8/2004 |

OTHER PUBLICATIONS

Edwards, Dave, "Wizards and Warriors," CultureCartel.com, Sep. 26, 2002, http://www.culturecartel.com/review.php?rid=10003934.*
Blizzard Entertainment, "The Arreat Summit—F.A.Q. Realms," 2001.*
Blizzard Entertainment, "The Arreat Summit—Basics: Character Information," 2001.*

(Continued)

*Primary Examiner* — Kee M Tung
*Assistant Examiner* — Sing-Wai Wu
(74) *Attorney, Agent, or Firm* — H.C. Park & Associates, PLC

(57) ABSTRACT

Disclosed is a character service method and system having a game item function. In one embodiment, a method is provided for generating a character by a character generating system including a gamvatar provider, a gamvatar controller, and a game server. The method includes providing an avatar to a user accessing the character generating system online, checking whether the user desires to combine a game item function with the avatar before progressing a game when the user acquires the game item function, combining the game item function with a corresponding layer of the avatar when the user desires to combine the game item function with the avatar, and d) generating the combined gamvatar.

11 Claims, 10 Drawing Sheets

OTHER PUBLICATIONS

Blizzard Entertainment, "The Arreat Summit—Items: Basic Item Information," 2001.*
Blizzard Entertainment, "The Arreat Summit—Items: Basic Item Information," 2003.*
English language abstract of Korean Publication No. 2002-0073313.
English language abstract of Korean Publication No. 2003-0026506.
English language abstract of Japanese Publication No. 2003-0089023.
English language abstract of Japanese Publication No. 2004-0069303.
Impress Watch Inc. (2003). "Add My Son-Oh-Gong in the Han Game Japan Abata System". Retrieved Aug. 18, 2008, from http://www.watch.impress.com.jp/game/docs/20030623/hangame.htm.

* cited by examiner

METHOD AND SYSTEM FOR PROVIDING CHARACTER HAVING GAME ITEM FUNCTIONS

CROSS-REFERENCE TO RELATED APPLICATION

This application is a U.S. national phase application of PCT International Application No. PCT/KR2005/002716, filed Aug. 18, 2005, which claims priority of Korean Patent Application No. 2004-0067871, filed Aug. 27, 2004, the contents of which are incorporated herein by reference in their entirety.

BACKGROUND OF THE INVENTION (a) Field of the Invention

The present invention relates to a method and system for servicing characters having game item functions. More specifically, the present invention relates to a method and system for servicing characters having game item functions of a specific game in the case of characters provided by an online web site.

(b) Description of the Related Art

Because of the recent improvements in high-speed communication networks and high-performance personal computers (PCs), the Internet gaming environments have become more sophisticated, which has in turn led to an increase in the number of available Internet games.

In internet gaming, a game program is generally downloaded to a computer terminal of a user and is then installed therein to execute the game on the Internet. Games executable on the Internet include, among others, strategic simulation games, multi-user dungeon (MUD) games, and role playing games (RPG) serviced between a server and an Internet user.

In particular, strategic simulation games and MUD games passively progress with programs that are performed and executed according to the program instructions. The user may select a game character and a game method and may play the game by using various options, such as controlling game characters to acquire various weapons, armor, accessories, and shoes, as well as strengthening the power of the character and increasing the life of the character during the game play. That is, various services that assist in maintaining the excitement of the user are provided by incorporating various character options or various game items that allow a player to personalize the gaming experience during the game.

FIG. 1 shows an Internet connection schematic diagram of a general online game service system. An Internet user 100 having a plurality of user computers 110, 120, and 130 accesses a game web site 200 through the Internet 300 to receive an online game service. In this instance, the game web site 200 includes a web server 210, a channel server 220, a channel database 230, a game server 240, and a game database 250, that collectively provide the online gaming services.

Referring to FIG. 1, when the Internet user 100 desires to play an online game, he or she may use at least one of the user computers 110, 120, and 130 to access the web server 210 of the game web site 200, and play the corresponding game in cooperation with the channel server 220 and the game server 240 of the game web site 200.

The web server 210 may also provide various services to the user computers 110, 120, and 130 including chat, community, and shopping mall services in addition to the various Internet gaming services.

The channel database 230 stores game room data generated in each channel as well as channel data of each game.

The channel server 220 provides a selected game channel and a game room list for each channel to the user by referring to the channel database 230 when the user selects the game through the web server 210. Therefore, the user can select a channel for playing the game and a specific game room belonging to the channel through a channel list and a game room list provided by the channel server 220.

The channel server 220 can also coordinate the entrance of a new user to a game room while other users are playing the game.

The game database 250 stores game logic for controlling the execution of the game and information on game scores acquired by each game winner in each game.

The game server 240 provides a game service selected by the user through the channel server 220. That is, the game server 240 executes the game according to the game logic provided by the game database 250.

The character may represent an animation character for performing the user's role in cyber space, includes an avatar, and supports the user's desires identity in cyber space. In this instance, the terminology avatar is originated from the combination of the Sanskrit word "Ava," meaning descent, and the word "Terr," meaning below or land. It indicates the incarnation of a Hindu deity or an incarnation in human form in old India. In internet gaming, however, avatar has come to indicate a 2D or 3D character that represents a user in cyber space. The avatar lives its independent life as a member of the Internet community, has various items for presenting its appearance and personality, and distinguishes itself from others in cyber space.

FIG. 2 shows a block diagram of a conventional avatar service system for providing avatars and game items, including a game server 240, a game database 250, an avatar shop 260, and a game item shop 270, which are connected through the Internet to a user computer 100.

Referring to FIG. 2, a user having accessed the web site 200 through the user computer 100 acquires or buys an avatar from the avatar shop or the avatar server 260, and accesses the game server 240 to play a game. In this instance, a user may enter the game being progressed by the game server 240 and game database 250 by using the avatar.

Also, the user can buy a game item from the game item shop or the item server 270 and use it in the game. A game item can be, for example, a game tool, such as a money recovery item. Game items may be purchased by the user separate from the avatar, and they may include supplemental game uses in certain games, such as card games and Korean Go-Stop. However, the user generally uses the game item in a game after buying it at the game item shop 270 to receive merits according to the specific characteristics of the item, such that it allows the user to enter the game with an advantageous condition.

FIG. 3 shows a general avatar provided on the left and a game item provided on the right.

Referring to FIG. 3, the avatar has a body 310, a jacket 320, pants 330, an accessory 340, hair 350, and a background 360. The user may generally buy the jacket 320, the pants 330, the accessory 340, the hair 350, and the background 360 at the avatar shop 260 on the web site. The avatar may be varied according to the user's interests and selection, and each purchased avatar item can be separately stored in the My Wardrobe.

Specifically, the avatar has multiple layers to display the respective avatar items. In this instance, each item may have a single layer or multiple layers. For example, upper layers 1 to 15 are provided for accessories, layers 16 to 45 are provided for the body of the avatar and items (hair, costumes, and facial expressions) given to the body of the avatar, and lower avatars are provided for additional items or background.

The example item 380 (shown on the right) indicates a black knight provided for restoring money in a card game. As described above, the item 380 may be purchased at the game item shop 270 and may be used so as to give an advantageous condition to the user in the game while the game is played.

Recently, a gamvatar, which is an avatar for exclusive use in a game and has features and personalities particularly associated with that game, has been introduced.

The gamvatar concurrently functions as a game character in a network game being played over the Internet, and as an avatar on the web site. That is, the gamvatar purchased or configured on the web site is applicable to the game, and the gamvatar purchased or configured in the game is applicable to the web site. In this instance, the gamvatar—the combination of the game and the avatar—indicates a game character having the format of an avatar or an avatar having the format of a game character, and is personalized by the same member ID accessible to a predetermined game and the web site 200.

For example, a predetermined gamvatar user can buy or sell items on the web site with "charges" and decorate the items, such as with clothes and accessories. Similar interactions may also occur in a chat service, a date service, and a community on the web site.

Items of the gamvatar bought with charges on the web site may be more gorgeous or exciting and have better performance characteristics (e.g., power, spell, experienced values, life, and skills) than the items acquired without charges during game play. When the gamvatar user accesses a game with the ID and the password used to access the web site, the gamvatar appears as a game character, and may generate more interest since it wears the items purchased on the web site.

The above-described gamvatar items have the features of the existing game characters and avatars, are newly configured to be animation items, and are defined to be items as accessories for decorating the gamvatars. Also, it may be determined by a user's game level whether a gamvatar item is available for purchase. Further, the items may be classified (such as clothes or accessories) depending on the corresponding gamvatar for which the item is being purchased.

Also, the items that are bought with charges may have various animation functions associated with them as compared to the items that are acquired free of charge, which increase the desirability of purchasing an item rather than trying to acquire it in the game itself.

However, the conventional avatars are provided separately from the game avatars, and they only provide mileages or money. Also, the conventional gamvatars represent avatars that are exclusive to a particular game and therefore only have features and personalities that correspond to that particular game. That is, conventional avatars indicate avatars for games without providing a game item function.

SUMMARY OF THE INVENTION

It is an advantage of the present invention to provide a method and system for servicing characters having game item functions in the case of characters provided by an online web site so that a user may enter a game by using an avatar having a game avatar function.

It is another advantage of the present invention to provide a method and system for servicing characters having game item functions in the case of characters provided by an online web site so that the user may selectively combine the user's avatar with a game item to thus have a more interesting avatar.

In one embodiment of the present invention, a method is provided for generating a character by a character generating system including a gamvatar provider, a gamvatar controller, and a game server. The method includes providing an avatar to a user accessing the character generating system online, checking whether the user desires to combine a game item function with the avatar before progressing a game when the user acquires the game item function, combining the game item function with a corresponding layer of the avatar when the user desires to combine the game item function with the avatar, and generating the combined gamvatar.

In another embodiment of the present invention, a method is provided for servicing a character by a character service system including a gamvatar provider, a gamvatar controller, and a game server. The method includes providing a gamvatar to a user accessing the character service system online, determining whether to use the game item function of the gamvatar according to the user's establishment, and applying the game item function of the gamvatar to the game according to the user's usage request.

In still another embodiment of the present invention, a system is provided for generating an online character having a game item function. The system includes an avatar provider for providing an avatar to a user accessing the character generating system, a game item provider for providing a game item according to the user's selection, a gamvatar provider for generating a gamvatar and providing the gamvatar when the user desires to combine the avatar with the game item, a gamvatar controller for allowing the user to edit the gamvatar so as to combine the avatar with the game item and allowing the generated gamvatar to be used in the corresponding game, and a gamvatar database for storing information on the generated gamvatar.

In still yet another embodiment of the present invention, a system is provided for servicing an online character having a game item function. The system includes a gamvatar provider for generating a gamvatar a game database for storing game logic structured to control the information and performance of respective games, a game server for progressing a game according to the game logic associated with the game by referring to the game database and applying a game item function of the gamvatar to the game according to the user's selection, a gamvatar database for storing information on the gamvatar, and a gamvatar controller to determine when the gamvatar is to be used or exhausted by referring to the gamvatar database.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENT

Figure 1:
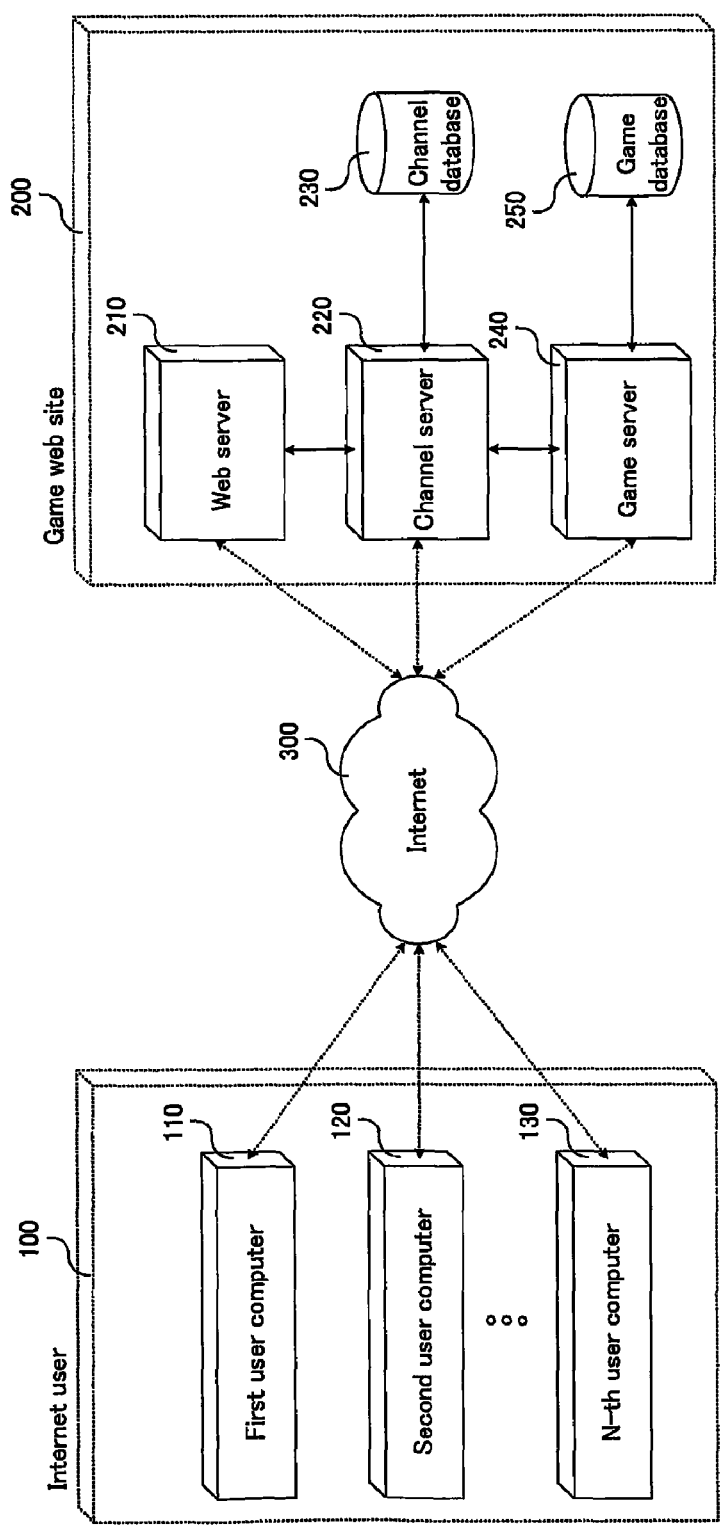
FIG. 1 shows an Internet connection schematic diagram of a general online game service system.
Figure 2:
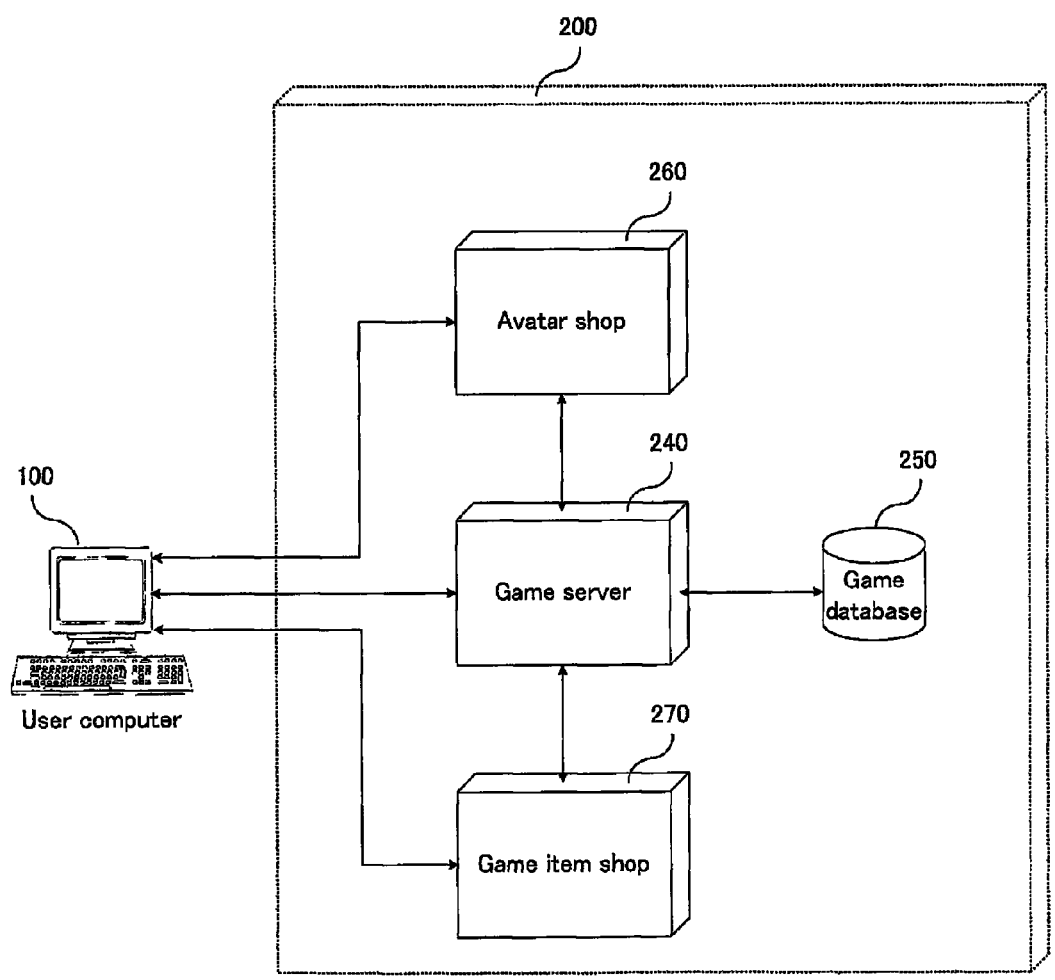
FIG. 2 shows a block diagram of a conventional avatar service system for providing avatars and game items.
Figure 3:
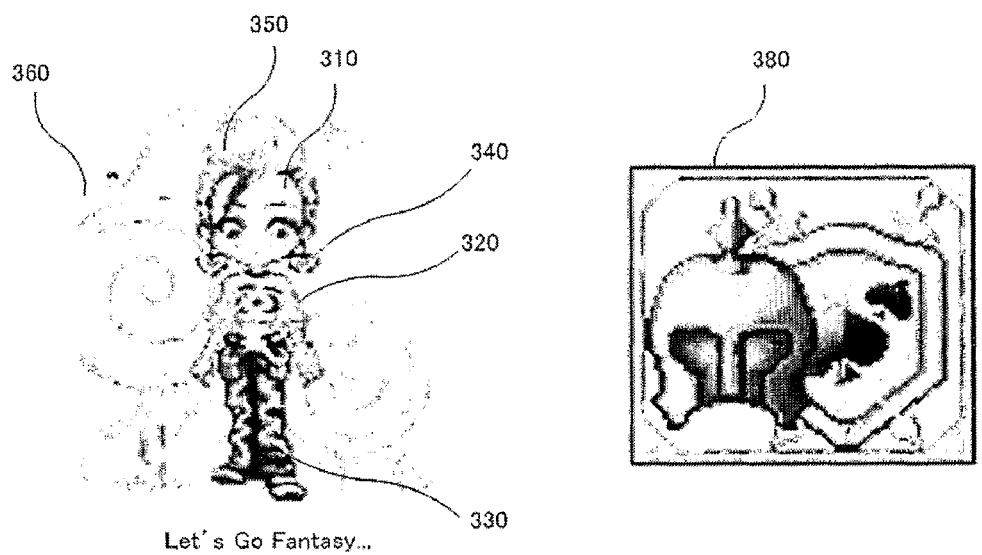
FIG. 3 shows a general avatar and a game item.

In the following detailed description an embodiment of the invention has been shown and described with reference to the above drawings. However, the invention is capable of being modified in various respects, without departing from the invention. Accordingly, the drawings and description are to be regarded as illustrative in nature, and not restrictive. To clarify the present invention, parts which are not described in the specification are omitted, and parts for which same descriptions are provided have the same reference numerals.

The avatar having a game item function according to an embodiment of the present invention does not represent a gamvatar that is a conventional avatar for exclusive use of a game but represents a gamvatar that is an avatar for performing a game item function. That is, the conventional gamvatar indicates an avatar used for a specific game, and the gamvatar according to the embodiments of the present invention combines the conventional avatar with the game item function. Hence, the gamvatar described in the embodiments of the present invention is substantially an avatar that is capable of performing game item functions.

Figure 4:
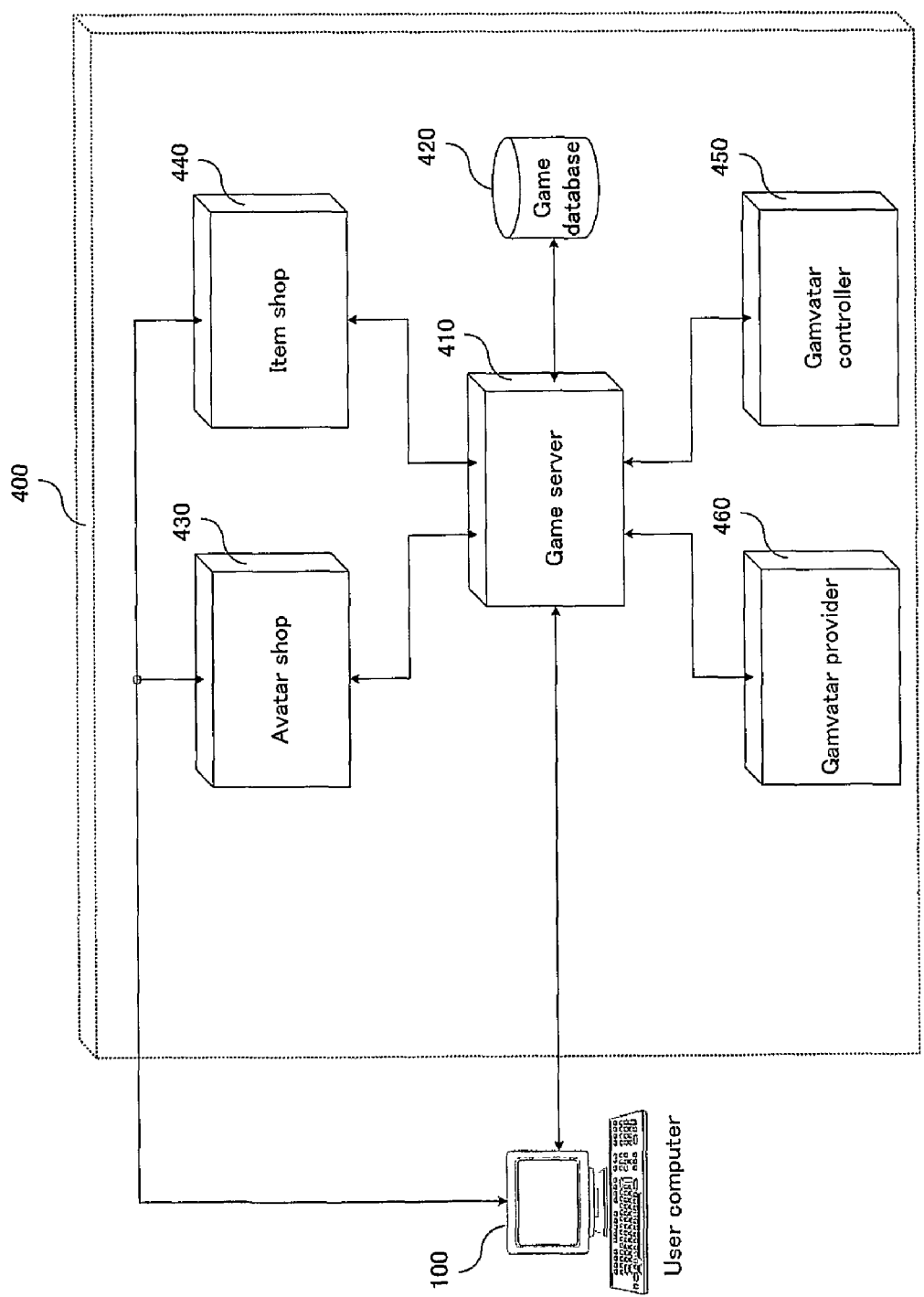
FIG. 4 shows a schematic diagram of a character service system having a game item function according to an embodiment of the present invention.

FIG. 4 shows a schematic diagram of a character service system having a game item function according to an embodiment of the present invention. The character service system 400 having a game item function includes a game server 410, a game database 420, an avatar shop 430, an item shop 440, a gamvatar controller 450, and a gamvatar provider 460.

The avatar shop or the avatar server 430 controls the user to access a web site and buy an avatar. The purchased avatar is stored in the My Wardrobe, for example, and the avatar can be put on according to the user's selection and taste.

The item shop or the item server 440 allows the user to buy a game item related to the game. The purchased item is stored in the Item Bag, for example, and the user can use the item according to the user's selection during or after playing the game. In this instance, as to avatars and game items provided in a game, the My Wardrobe indicates a unit in which the avatar is stored or put on by the user, and the Item Bag indicates a unit for storing game items.

The gamvatar provider 460 provides controls to generate the gamvatar by combining the game item function to a corresponding layer of the avatar, or allows the user to buy the gamvatar from the gamvatar shop (or the avatar shop) within the web site. That is, since the gamvatar can be purchased according to the user's selection, the gamvatar can be provided separately from the item shop or the avatar shop, and it can be purchased at the item shop or the avatar shop if necessary.

The gamvatar database 470 stores the gamvatar purchased by the user or the gamvatar generated when the user controls the avatar to put on the item, and stores the data on the gamvatar until the user exhausts the gamvatar by using the game item function.

The game database 420 stores game logic for controlling execution of the game and corresponding information on game scores acquired by game winners after playing the game. The game server 410 executes the game according to the game logic defined for each game by referring to the game database 420. The game server 410 also displays the game, executes the game, and settles game results so that the user may play the corresponding game. Also, the game server 410 applies the game item function of a gamvatar to the game when the gamvatar generated by the gamvatar provider 460 is requested by the user during or after the execution of the game. The game item function of the gamvatar includes the function of charging and restoring cyber money, a function of reinforcing power of the gamvatar, and a function of attacking or defending other garners. For example, the game server 410 restores money according to the user's request when the gamvatar is a gamvatar for restoring cyber money.

The gamvatar controller 450 controls the usage of the gamvatar during the game service provided by the game server 410 by referring to the gamvatar database 470. Thus, it controls provisions of the gamvatar to the user and usage thereof by the user. The gamvatar may be generated by the gamvatar provider 460 and/or may be purchased. The gamvatar controller 450 controls the gamvatar's usage time management and disappearance from the avatar wardrobe after a predetermined time has passed.

Figure 5:
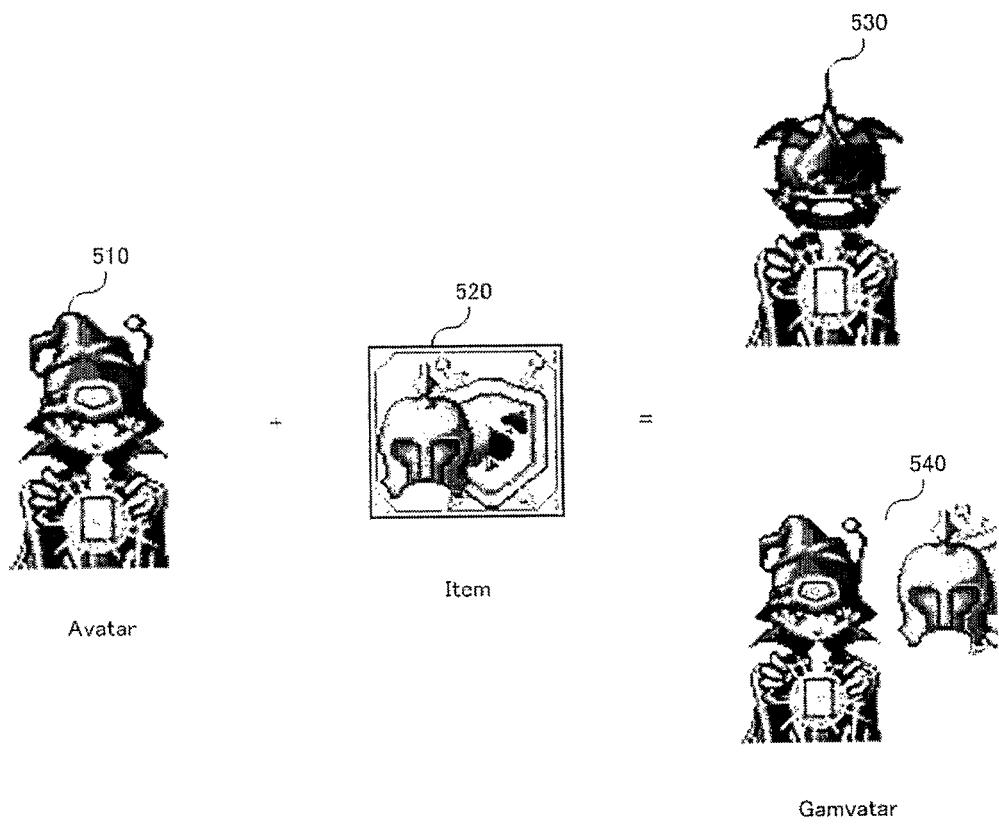
FIG. 5 shows characters having a game item function according to an embodiment of the present invention.

FIG. 5 shows avatars (gamvatars) having a game item function according to an embodiment of the present invention, and it exemplifies gamvatars 530 and 540 generated by combining an avatar 510 which wears clothes purchased at the avatar shop 430 and a game item 520 purchased at the item shop 440. The gamvatar 530 shows the avatar 510 wearing the item 520, and the gamvatar 540 shows that the item 520 is not attached to the avatar 510 but is arranged in the background layer. As described above, it is possible for the avatar 510 to wear the item 520 or not to wear the item 520 depending on the user's setting.

Also, the avatar of the gamvatar according to some embodiments may show a predetermined motion, perform an item function, and adaptively perform a specific function when the avatar reaches a specific condition according to the user's status.

Further, the avatar of the gamvatar can show a predetermined facial expression or a motion when a button is pressed or an emoticon is input (which requires an input window). For example, the avatar can abruptly appear to disclose the usage time of a game item according to the amount of game money the user lost during game play, or the avatar can automatically respond to the money level of other garners.

As a result, the gamvatar according to the embodiment of the present invention is an avatar displayed with the use of a function. Thus, the gamvatar still has an avatar characteristic such that it is displayable according to the usage of the function and is not displayable after a usage period. In addition, a game item is combined with the avatar by adding a predetermined layer to the avatar, and the game item disappears from the corresponding layer of the avatar when a predetermined time is passed after the game item is used. That is, the game item can be put on at the time of buying it since the game item is provided in a form in which the game item is added in a layer format to the existing avatar.

In the gamvatar according to the embodiment of the present invention, for example, the avatar is provided into the My Wardrobe and the game item is provided into the Item Bag. The avatar of the gamvatar wears the gamvatar in the My Wardrobe and disappears from the My Wardrobe after a predetermined time has passed. The gamvatar can also be sold in the avatar area, as it is essentially an avatar with added item functionality.

Also, the gamvatar is an avatar for generating a specific function when the user status reaches a specific condition, and the avatars of the gamvatar perform a function or an operation when the user presses buttons, such as when the user inputs emoticons such as "^^" and "TT".

Also, the gamvatar may have a function of displaying a usage time by abruptly showing the avatar according to the amount of lost money or controlling the avatar to respond automatically according to other users' money levels. Further, the gamvatar is to notify the avatar of a usage start time when a black rose/black knight/power chance is used in the client so that the gamvatar avatar may disappear in twenty four hours with respect to the item usage time.

In addition, the gamvatar provider can transmit the gamvatar to the user. That is, the gamvatar database stores information on various gamvatars to be provided to the user, and can transmit the gamvatar including the avatar having a plurality of layers to the user computer 100 based on the information on the gamvatar stored in the gamvatar database.

Here, the avatar with multiple layers uses the respective layers to display avatar items. In this instance, the respective items may have a single layer or multiple layers. That is, an upper layer may be a layer for accessories, another layer may be a layer for the avatar body and items attached to the avatar body, and a lower layer may be a layer for an additional item or backgrounds. When the avatar is displayed to the user, the multiple layers of the avatar are accumulated from the lowest layer to the highest layer and are then displayed in a complete format to the user. Also, the user can selectively edit the gamvatar when the game item function is combined with the corresponding layer of the avatar.

As to the game items in the gamvatar according to the embodiment of the present invention, a plurality of different game item functions can be combined with the avatar, and the corresponding game item function can be exhausted each time the game item function is used. In this instance, the avatar may disappear when the final game item function is used.

Figure 6:
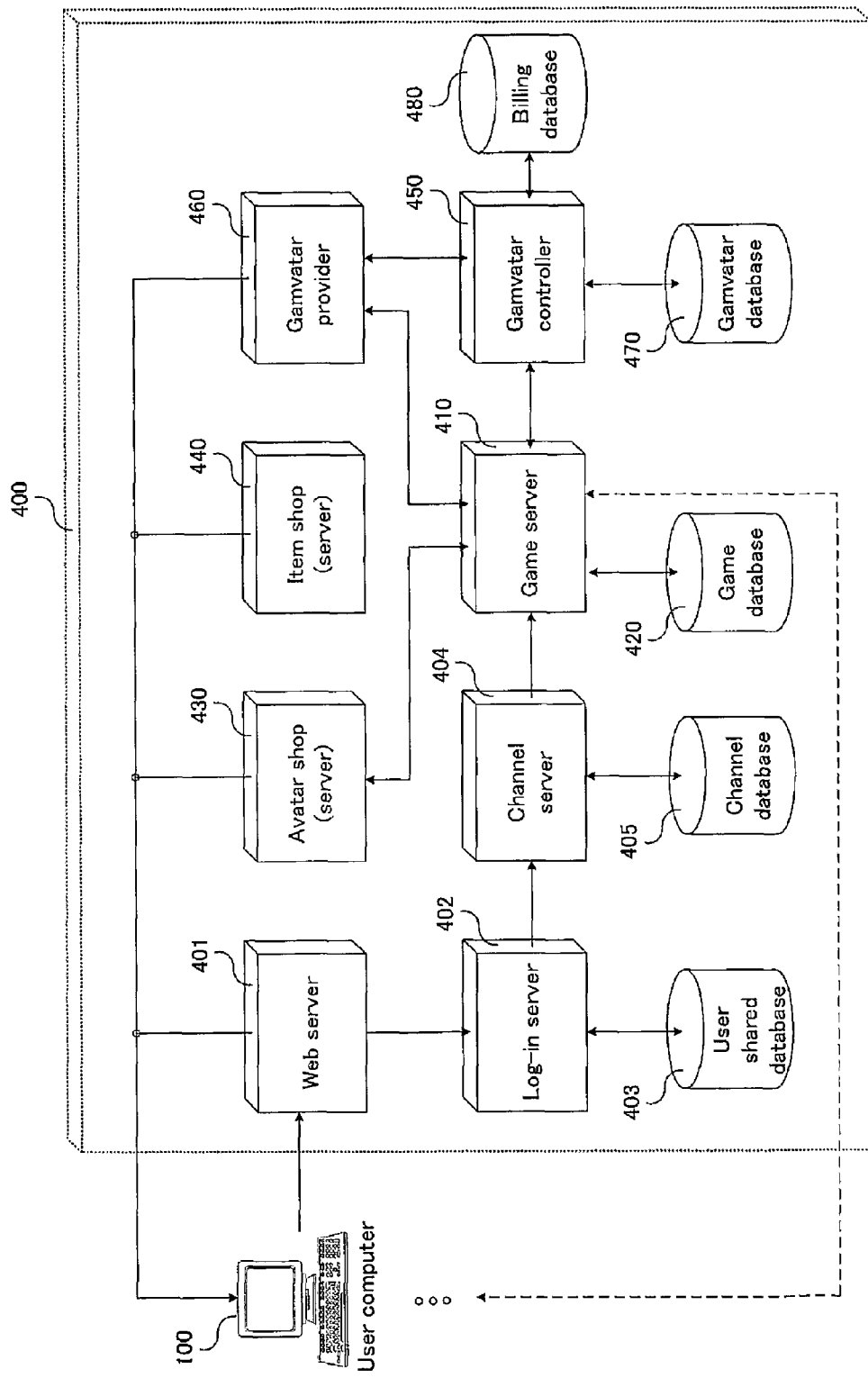
FIG. 6 shows a detailed schematic diagram of a character service system having a game item function according to an embodiment of the present invention.

Referring to FIG. 6 through FIG. 10, an avatar service system and method having a game item function according to an embodiment of the present invention will be described FIG. 6 shows a detailed schematic diagram of an avatar service system having a game item function according to an embodiment of the present invention. The avatar service system 400 having a game item function includes a web server 401, a log-in server 402, a user shared database 403, a channel server 404, a channel database 405, a game server 410, a game database 420, an avatar shop 430, an item shop 440, a gamvatar controller 450, a gamvatar provider 460, a gamvatar database 470, and a billing database 480, and may further include a game resource server or a chat server (not illustrated).

The user computer 100 includes a hardwired device, an operating system (OS) program, and a web browser, wherein the hardwired device includes a CPU, a main memory, a hard disk drive, an input/output device, a graphic card, a LAN card, and a high-speed Internet terminal (such as an ADSL modem). The operating system (OS) program may include Windows 2000® or Windows XP® by Microsoft®, or a similar operating system, and the web browser may include Internet Explorer®, or a similar browser. The user computer 100 is connected through the Internet to a gamvatar web site with a specific URL address. The user computer 100 installs cookie data when the user becomes a member of the web site, and it installs a game client, which is a program, when the user becomes a user of a predetermined game provided by the web site. The game client installed in the user computer 100 configures a general network game and performs gamvatar-related functions.

For example, the game client has various default graphics data required for executing the program based on TCP/IP, default game files for defining rules, and logic for updating files. Also, the game client is a typical game avatar network game program, which includes a personal access module programmed for accessing the game server. The game program may also include a communication module programmed for performing a chat during execution of the game, calling information on a gamvatar (item) purchase list to update with a new gamvatar, a module for playing and storing the game used for playing the game, and a module for wearing items.

The game server 410 is a game server program used in cooperation with the game client installed in the user computer 100, and includes a TCP/IP-based default game module, a multi-user access module, a multi-user communication module, a game service unit, a member certifier, and a database update module. The game server 410 may further certify membership and provide additional game services to the game client.

The web server 401 provides various Internet games and various services including a chat service, a community service, and a shopping mall service to the user computers 100. The web server 401 is a network computer system including a web engine for managing the web site, and total solutions for managing members, gamvatars, game guilds, communities, and emails, as well as controlling certification of members, performing buying and billing calculations on the gamvatars and items, and displaying the gamvatars and items.

In this embodiment, user computers 100 have been described; however, other terminals for accessing the web server 401 through the Internet and executing the game may also be used, such as a mobile communication terminal or an Internet TV.

The channel database 405 stores channel data for respective games and game data generated in the respective channels.

The channel server 404 refers to the channel database 405 and provides a selected game channel and a game room list of channels to the user when the user selects a game through the web server 401 so that the user may select a channel for playing the game and a specific game room belonging to the channel through the channel list and the game room list provided by the channel server 404. In this instance, when the user selects the game through the web server 401, the web server 401 may instruct the user program of the pre-installed game on the user computer 100 to connect to the channel server 404 through the Internet. Hence, it is not necessary to directly connect the channel 404 to the web server 401.

The channel server 404 can allow a new user to enter the corresponding game room while other users play the game. In this instance, the new user stands by as an observer while the current game is being played.

The game database 420 stores game logic for controlling the execution of the game and information on the game scores acquired by the game winner.

The game server 410 provides various game services selected by the user through the channel server 404. That is, the game server 410 progresses the game according to the game logic established by each game by referring to the game database 420.

Also, the avatar service system 400 having a game item function according to the embodiment of the present invention allows a log-in process through the web server 401, and controls the user to enter the game from the web server 401 through the log-in server 402, a game resource server (not illustrated), and the avatar server 430, and also allows a chat service through a chat server (not illustrated) which is provided as an additional window while the game is executed.

The avatar shop or the avatar server 430 allows the user to access the web site and buy an avatar, and the item shop or the item server 440 allows the user to buy a game item relating to the game.

The gamvatar provider 460 combines the item function to the corresponding layer of the avatar to generate a gamvatar, or controls the user to directly buy the gamvatar from the gamvatar shop (or avatar shop) in the web site.

The gamvatar database 470 stores the gamvatar purchased by the user or the gamvatar that is generated by buying an item and putting it on the avatar, and stores data on the gamvatar until the gamvatar is exhausted by using the game item function of the gamvatar by the user.

The gamvatar controller 450 in connected to the gamvatar database 470, controls usage of the gamvatar among the game services provided by the game server 410, controls provision of the gamvatar to the user and usage thereof, the gamvatar being generated by the gamvatar provider 460 or being purchased, and controls management of a usage time of the gamvatar and the disappearance of the gamvatar in the avatar wardrobe after a predetermined time frame.

The billing database 480 is a database for billing the item purchased by the user on the gamvatar or the avatar. That is, when the gamvatar is purchased with a predetermined charge, the user is billed according to the purchase of the gamvatar, and the billing database 480 stores corresponding billing information.

Figure 7:
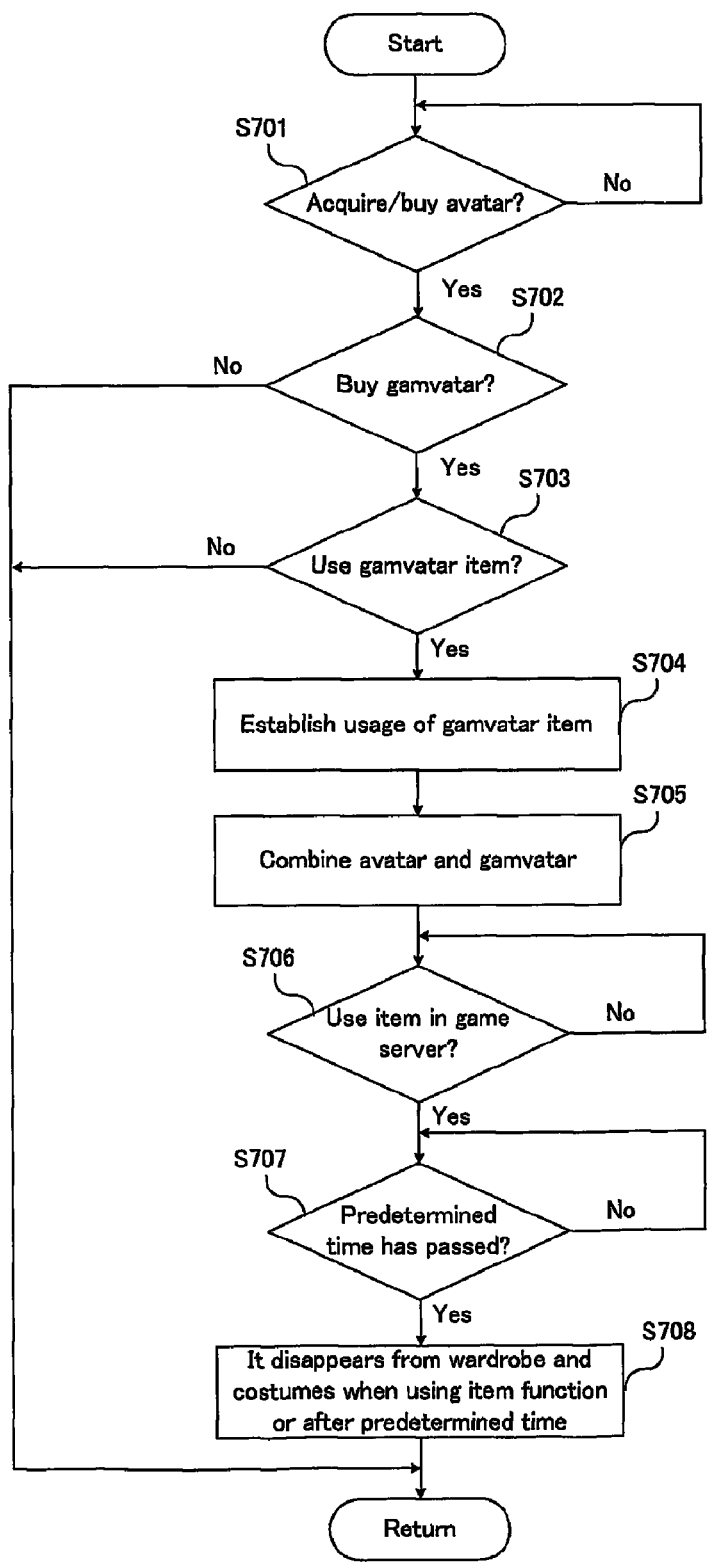
FIG. 7 shows a flowchart of a character service method having a game item function according to an embodiment of the present invention.

FIG. 7 shows a flowchart of an avatar service method having a game item function according to an embodiment of the present invention.

Referring to FIG. 7, an avatar service method having a game item function can check whether the user accesses an online web site and acquires or buys an avatar in step S701 or buys a gamvatar that supports the game item function in step S702.

The user checks whether to use the gamvatar in step S703, and establishes detailed usage of an item of the gamvatar in step S704 when the user uses the gamvatar.

The avatar is combined with the gamvatar in step S705, and it is determined whether the gamvatar item will be used in the game server in step S706. That is, it is determined whether to use and exhaust the gamvatar item in the game, and when the user selects usage of the gamvatar item, the game server applies the item function to the game. For example, when the user uses a gamvatar item function for restoring money, the user's money is restored according to the preset item function.

It is then checked whether a predetermined time (for example, twenty four hours) has passed in step S707. When has been determined that the predetermined time has passed (that is, when the time has passed after the item function is used), the gamvatar disappears in the wardrobe and the "put-on state" in step S708.

Figure 8:
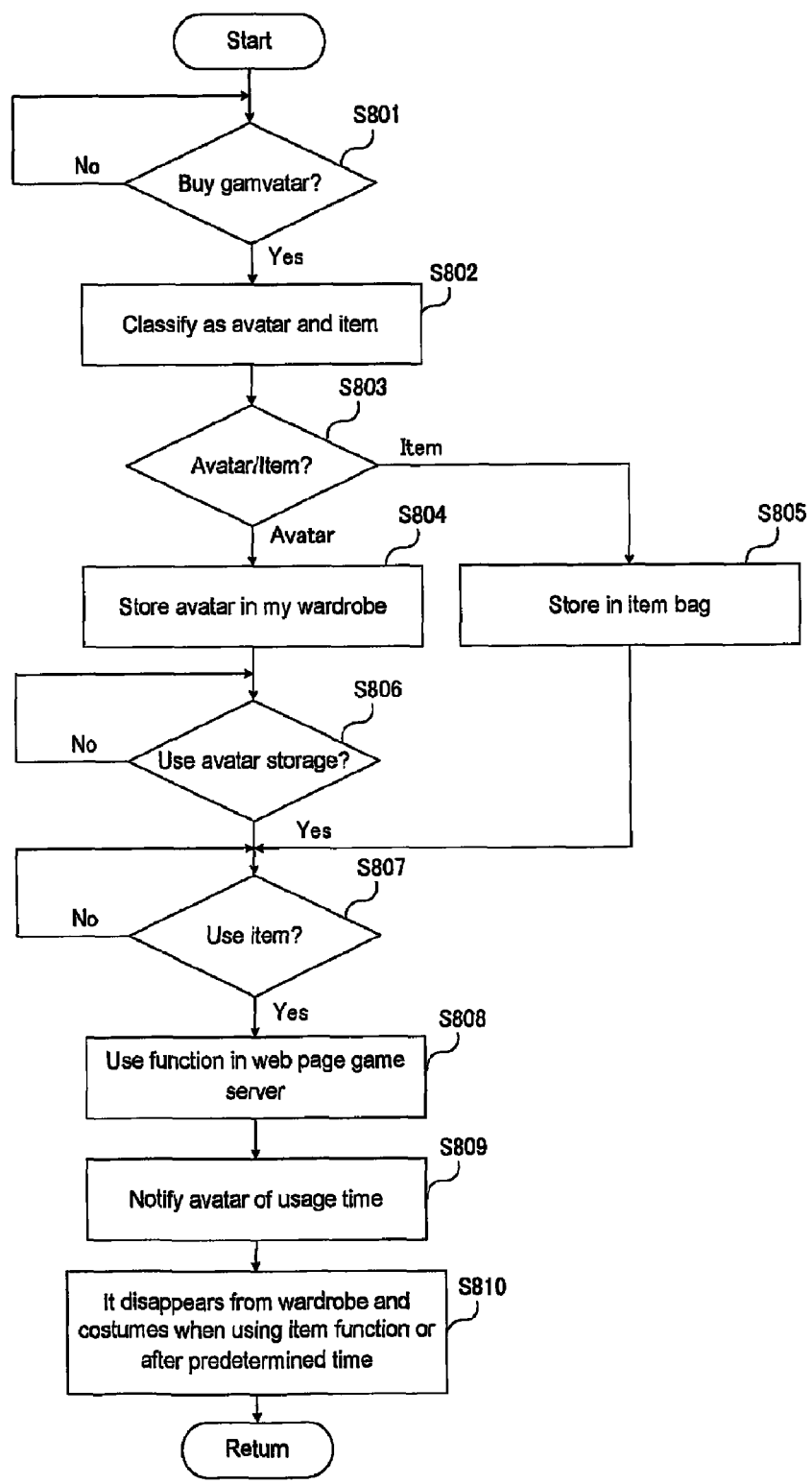
FIG. 8 shows a flowchart of buying, storing, and using a character having a game item function according to an embodiment of the present invention.

FIG. 8 shows a flowchart of buying, storing, and using an avatar having a game item function according to an embodiment of the present invention.

Referring to FIG. 8, when the user buys an avatar (gamvatar) having a game item function in step S801, the gamvatar controller classifies the gamvatar as an avatar and an item in step S802.

If the classification indicates that the gamvatar is an avatar, the avatar is stored in the My Wardrobe in step S804. If, however, the classification indicates that the gamvatar is an item, the item is stored in the Item Bag in step S805. In this manner, other avatars or items previously purchased can be stored in the My Wardrobe or the Item Bag. Also, the purchased gamvatar can wear the gamvatar in the My Wardrobe, and can additionally combine the gamvatar to the avatar of the gamvatar, or only wear the gamvatar.

The user holds/uses the avatar in step S806, and checks whether to use the item in the game in step S807. That is, when the user plays the game or needs to use the item after playing the game, the user selects usage of the item, and uses the item function on a progress screen of the game server provided to the web page in step S808.

In this instance, the usage time of the game item of the gamvatar is reported to the avatar in step S809, and the gamvatar disappears from the wardrobe and/or the avatar costume according to the usage status of the game item function of the gamvatar or after a predetermined time in step S810. In this instance, the avatar of the gamvatar disappears from the My Wardrobe when a predetermined time (for example, twenty four hours) has passed after the game item function of the gamvatar is used.

Figure 9:
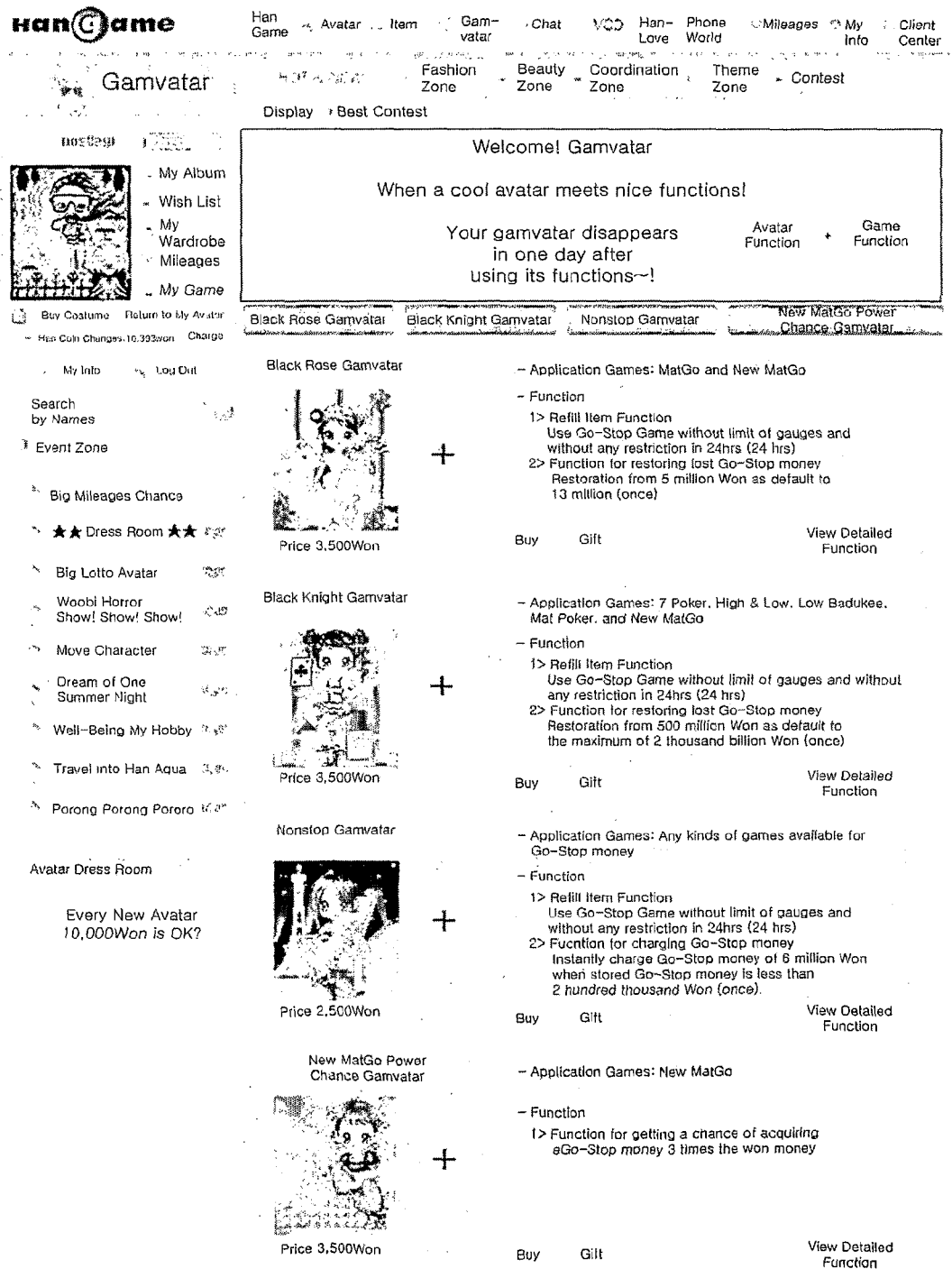
FIG. 9 shows a web site for providing a character having a game item function according to an embodiment of the present invention.

FIG. 9 shows a web site for providing an avatar having a game item function according to an embodiment of the present invention.

Referring to FIG. 9, the web site for providing an avatar having a game item function according to the embodiment of the present invention provides a gamvatar having an avatar function and a game item function, and the gamvatar includes a black rose, a black knight, a nonstop, and a new MatGo power chance gamvatar.

In this instance, each gamvatar is provided in a similar format of the general avatar, and an item function can be combined with a predetermined layer of the avatar.

For example, the black knight gamvatar is applied to games such as seven poker, high and low card, low Badukee, Mat poker, and Sotda, and it has a refill item function for restoring exhausted game money. That is, the black knight gamvatar can use the poker game without limitation of gauges in twenty four hours and has a function of restoring predetermined poker money only once.

The user can buy the gamvatar on the web site or can buy and give it to another user.

Figure 10:
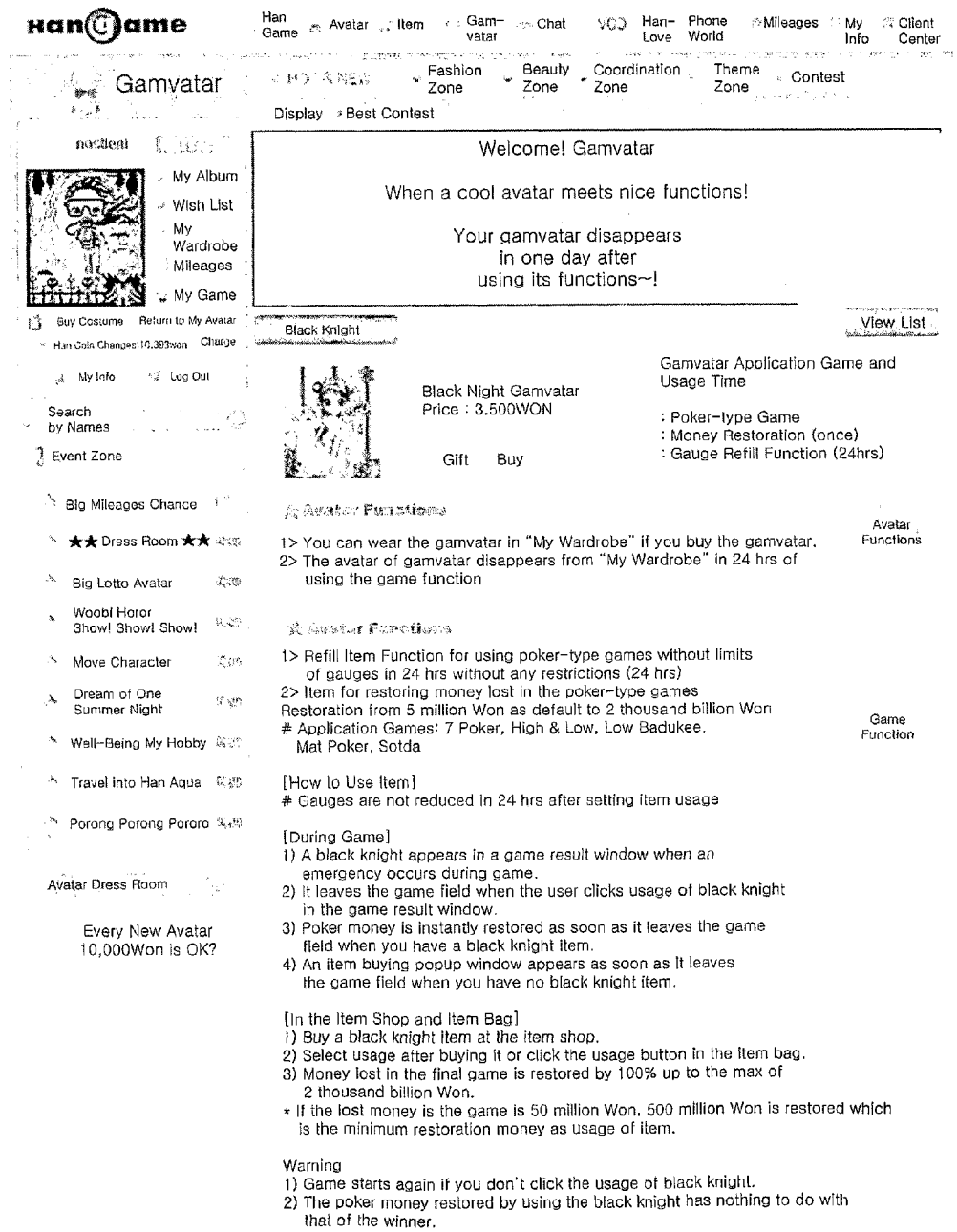
FIG. 10 shows a function and a usage method of a character having the game item function shown in FIG. 9 according to an embodiment of the present invention.

FIG. 10 shows a function and a usage method of an avatar having the game item function shown in FIG. 9 according to an embodiment of the present invention.

The avatar having a game item function according to the embodiment of the present invention has an avatar function and a game item function as described above, and the black knight gamvatar described with reference to FIG. 9 will now be described in detail.

The black night gamvatar has an avatar function, and the purchased gamvatar can be put on in the My Wardrobe of the avatar, and the avatar of the gamvatar disappears from the My Wardrobe after twenty four hours during which the game item function is used or passed.

Also, the black knight gamvatar has a refill item function as a game item function for using poker-type games without limitation of gauges in twenty four hours. That is, the black knight gamvatar represents an item for restoring lost money in poker type games, and it is applicable to seven poker, high and low card, low Badukee, Mat poker, and Sotda—but only once.

As to the item usage method of the black knight gamvatar, a black knight appears in a game result window in an emergency case during the game and the black knight disappears from the game field when the user clicks to use the black knight. The poker money is instantly restored as soon as the black knight leaves the game field when the user already has the black knight item. When the user has no black knight item, an item buying popup window appears as soon as the black knight leaves the game field, and the poker money can be restored upon buying the item.

Further, as to the item usage method of the black knight gamvatar, the user can buy a black knight item at an item shop, and also can select usage thereof just after buying it or clicking a usage button in the Item Bag. The user can also restore the lost money in the finished game by the maximum (100%) amount of money that can be restored. If the lost money is given as 50 million Won, the minimum restoration money of 500 million Won can be restored by using the item. In this instance, the game starts again when the user does not click the black knight item, and the poker money restored by using the black knight has no relation to the poker money of the game winner.

As a result, in the gamvatar according to the embodiment of the present invention, the gamvatar's game item usage method has the format of controlling the gauge to be not reduced for a predetermined time after the time of establishing the item usage. And the method is provided in the format of a gamvatar generated by combining the user avatar and a game item, such as a black knight, a black rose, a nonstop, or a power chance. For example, when a black rose is used by the client during the game, a black rose avatar appears to show a specific motion and concurrently a money restoration item function is performed. Also, the respective gamvatar items have avatar shapes. An avatar can be added into the avatar wardrobe at each purchase and it disappears when the game item is used (it can disappear, for example, after a period of twenty four hours).

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, an avatar is provided on the online web site, that is not a gamvatar of an avatar for exclusive use of a game but an avatar that performs a game item function so that the user can join the game by using the avatar having the game item function, and a more interesting character can be provided when the user selectively combines the game item to the user's avatar.

What is claimed is:

1. A method for generating a character associated with a character generating system comprising a gamvatar provider, a gamvatar controller, and a game server, the method comprising:
providing an avatar to a user accessing an avatar shop via a network, the avatar comprising multiple layers for displaying avatar functions or performing game item functions by using the respective layers; and
combining each of a plurality of game item functions with the avatar by adding the respective layers to the avatar to create a gamvatar associated with the plurality of the game item functions,
wherein the gamvatar is configured to be used to perform the plurality of the game item functions and each of the plurality of game item functions being combined with the respective layers is exhausted in response to detection of each time of using the each of the plurality of game item functions associated with playing a game provided by the game server.

2. The method of claim 1, wherein the gamvatar is selectively editable by using a user interface in response to determination of the selected game character being combined with the avatar associated with the plurality of the game item functions.

3. A method, using a processor, for providing a character service, the method comprising:
providing an avatar, the avatar comprising a plurality of layers for displaying the avatar or performing game item functions by using the respective layers; and
combining each of the plurality of game item functions with the avatar by adding the respective layers to the avatar to create a gamvatar,
wherein the gamvatar is configured to be used to perform the plurality of the game item functions and each of the plurality of game item functions being combined with the respective layers is exhausted in response to detection of each time of using the each of the plurality of game item functions associated with playing a game provided by the game server.

4. The method of claim 3, wherein the plurality of the game item functions comprise at least one of a function for charging or restoring cyber money, a function for reinforcing power of the gamvatar, or a function for attacking or defending other gamers.

5. The method of claim 4, wherein the gamvatar is configured to generate a predetermined facial expression or a motion to perform the game item function in response to detection of an input of a button or an emoticon provided by the user interface.

6. A non-transitory computer-readable medium comprising an executable program which, when executed, performs the steps of:
providing an avatar to a user accessing an avatar shop, the avatar comprising a plurality of layers for displaying avatar functions or performing game item functions by using respective layers; and
combining each of a plurality of game item functions being selected with the avatar by adding the respective layers to the avatar to create a gamvatar associated with the a game item functions,
wherein the gamvatar is configured to be used to perform the the plurality of the game item functions and each of the plurality of game item functions being combined with the respective layers is exhausted in response to detection of each time of using the each of the plurality of game item functions associated with playing a game provided by the game server using the gamvatar.

7. A system for generating a character via a network, the system comprising:
an avatar provider to provide an avatar in response to detection of accessing an avatar shop, the avatar comprising multiple layers for displaying avatar functions or performing game item functions by using the respective layers;

a gamvatar provider to combine the selected game item functions with the avatar by adding the respective layers to the avatar to create a gamvatar being combined with the selected game character associated with a plurality of the game item functions; and a gamvatar controller to edit the gamvatar corresponding to the respective layers of the avatar associated with the selected game item function, wherein the gamvatar is configured to be used to perform the plurality of the game item functions and each of the plurality of game item functions being combined with the respective layers is exhausted in response to detection of each time of using the each of the plurality of game item functions associated with playing a game, and wherein a database is configured to store information of the gamvatar.

8. The system of claim 7, wherein the gamvatar controller is configured to selectively edit the gamvatar using a user interface, the selective edition corresponding to each of the multiple layers of the avatar.

9. A system comprising a non-transitory storage medium for servicing a character via a network, the system comprising:

a gamvatar provider to generate a gamvatar, the gamvatar comprising an avatar being combined with a game character associated with a game item function, the avatar comprising a plurality of layers for displaying avatar functions or performing game item functions by using the respective layers, wherein the non-transitory storage medium is configured to store information relating to the gamvatar;

a game server to progress a game according to a game logic associated with a game, and to combine one or more of the game item functions selected with the avatar by adding the respective layers to the avatar, the selection is performed by using a user interface; and a gamvatar controller to control whether the gamvatar is to be used to perform the game item functions or each of the game item functions being combined with the respective layers is exhausted, the exhaustion is controlled in response to detection of each time of using the each of the game item functions, wherein the gamvatar is configured to be used to play a plurality of games provided by the game server via a network.

10. The system of claim 9, wherein the game item functions comprise at least one of a function for charging or restoring cyber money, a function for reinforcing power of the gamvatar, or a function for attacking or defending other gamers.

11. The system of claim 10, wherein the gamvatar is configured to generate a predetermined facial expression or a motion to perform the game item function in response to detection of an input by the user interface.

* * * * *